Dec. 4, 1951     J. HUDIG     2,577,617
FRACTIONAL DISTILLATION PROCESS
Filed April 28, 1947
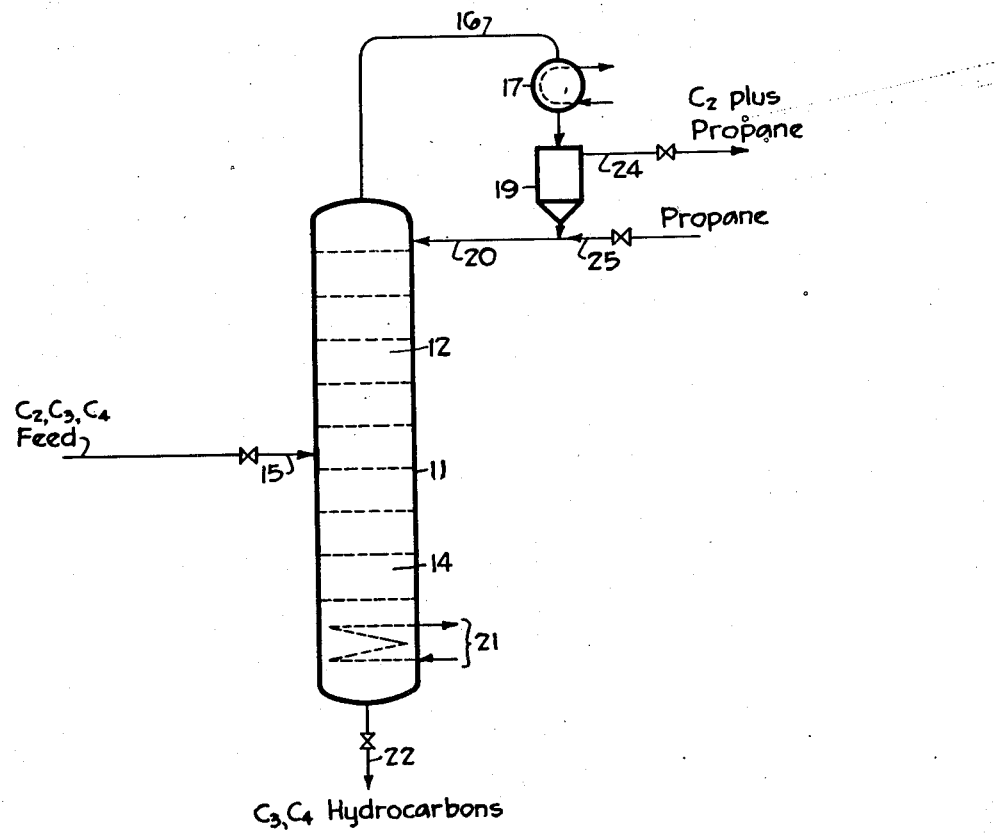
Inventor: Joost Hudig
By his Agent: John N. Colvin

Patented Dec. 4, 1951

2,577,617

UNITED STATES PATENT OFFICE

2,577,617

FRACTIONAL DISTILLATION PROCESS

Joost Hudig, Pasadena, Tex., assignor to Shell Development Company, San Francisco, Calif., a corporation of Delaware Application April 28, 1947, Serial No. 744,449

7 Claims. (Cl. 62—175.5)

This invention relates to a process of fractional distillation for the separation of a vaporizable mixture containing components having relatively close boiling temperatures, which components are difficultly separable by ordinary distillation. More particularly, the invention pertains to the separation by fractional distillation of hydrocarbon mixtures, more specifically lower molecular weight hydrocarbons, which mixtures contain at least two components which it is desired to separate one from the other to a high degree of purity, which components have boiling points that make it difficult to effect a high degree of separation between them by normal fractional distillation methods.

In the usual method of distillation for the separation of a mixture of substances having boiling points covering a range of temperatures, the mixture, either in the form of vapor or a mixture of vapor and liquid, is fed to a point in a fractionating column intermediate its ends, the lighter portions of the feed being rectified in the portion of the tower or column above the feed inlet location, and the heavier portions of the feed being stripped in the portion of the tower or column below the feed inlet. Usually, the fractionation equipment is a bubble plate tower, and the discussion herein will be directed to the use of such a tower, although packed towers, baffle plate towers, perforated plate towers and stage spray contact towers are all similar in functional characteristics and are held to be within the purview of this invention. In the usual case, the control of the rectification of vapors in the rectifying section of the tower is by condensation and return of a portion of the overhead vapors from the tower to the top of the tower as wet reflux. Other methods, such as a total condensation and withdrawal of condensate as overhead product, partial condensation, and the like are also utilized. The stripping of the liquid in the lower portion of the tower below the feed inlet point is usually accomplished either by addition of heat to the tower bottom by suitable heating means, such as a reboiler or the like, or by the introduction of a gaseous medium, either inert or related to the distilled material, for its partial pressure effect.

In the exemplary discussion presented herein, the materials treated, i. e. materials to be separated, are hydrocarbons; however, this is not intended to be limitative of the invention. The conditions of the treatment are generic in nature as will be understood by those skilled in the art.

In the indicated operation of fractional distillation, as practiced in the usual manner, as applied for example to the separation of a mixture of lower molecular weight hydrocarbons such as a mixture of $C_2$, $C_3$ and $C_4$ hydrocarbons, both saturated and unsaturated, to effect a separation, say between the $C_2$ hydrocarbons and the $C_3$, particularly unsaturated $C_3$, hydrocarbons contained therein, sacrifices in propylene recovery, for example, are taken because of limitations imposed upon the separation, which limitations are inherent in the process by virtue of the nature of the operations. For example, for a given feed composition containing ethane, propane, propylene and $C_4$ hydrocarbons in some given proportions, with the fractionation being effected at a predetermined pressure and under conditions to effect separation of ethane and propylene, the loss of propylene in the overhead along with the ethane is dependent on and fixed by a number of factors, such as the overhead condenser temperature, the amount of reflux which it is economically feasible and possible to return to the top of the tower, and the like. Similarly, the amount of ethane which must be accepted in the bottoms product is determined by similar factors and considerations, such as the amount of reboiling (therefore stripping) which it is economically feasible and possible to effect in the lower section of the tower.

It is, therefore, an object of this invention to provide an improved distillation process for separating mixtures of vaporizable substances. A further object is to effect a more complete recovery of propylene from ethane in a mixture thereof. Another object is to provide an improved distillation process for the recovery of propylene from ethane in a mixture thereof which also contains propane. These and other objects will be more fully understood from the description of the invention which will be given below.

It has now been found, in accordance with this invention, that the separation by distillation of two hydrocarbon components A and B in a mixture thereof, wherein B is less volatile than A under similar conditions, is greatly improved by the addition to, or augmentation of, the reflux liquid, from an extraneous source, of a third substance hydrocarbon C which has vapor pressure characteristics substantially similar to those of component B and is substantially inert both chemically and physically with respect to A and B and which substance C is maintained at an augmented concentration in the top portion of the rectifying section of the tower and a major proportion of which is withdrawn from the system with the withdrawn component A in the overhead product.

Described more specifically, an improved method has been provided for the separation of propylene from ethane in a mixture which contains ethane, propylene and propane, which mixture may or may not contain additionally, $C_4$ hydrocarbons (butanes and butenes), and methane. An improved recovery of the propylene is effected by replacing a portion of the normal reflux with a propane stream which is low in propylene. The effect of this replacement is to replace a portion of the propylene which would normally be present in the top product with propane, and recovery of the replaced propylene in the bottom product.

The injection of propane into the reflux, overhead, or reflux accumulator, supplies the $C_3$ hydrocarbon in the top vapor which is required to maintain the dewpoint for the given operating conditions, and propane-propylene from the feed, which would be lost to overhead by the usual method of operation, is now recovered in the bottom product.

In return for the sacrifice to top gas of relatively cheap injected propane to maintain the dewpoint, in addition to the advantage of increased recovery of the more valuable propylene in the bottom product of the column various operational advantages are obtained. A very important one is that lower pressure operation is made possible with several concomitant advantages. By injecting a considerable amount of propane and thereby increasing the reflux accumulator gas, a normal dewpoint of about 80° F. (temperature of condenser cooling water) can be obtained at a considerably lower pressure. For example, by increasing the $C_3$ percentage of the top gas from a normal value of about 23% up to a value of 35% by application of the method of the present invention, the column pressure may be reduced from an operating value of about 585 p. s. i. a. (pounds per square inch absolute) down to about 400 p. s. i. a. Lower operating pressures, in turn, result in further advantages:

(1) Better liquid-vapor disengaging—at high pressures normally required, fractionation occurs near the critical region for the bottom components, so that the liquid-vapor density ratio is low. Therefore, the disengaging and fractionating efficiencies are poorer than they are at lower pressures. Poor disengaging tends to lead to low liquid handling capacity. Thus, lower pressures may give higher capacity and plate efficiency, which, of course, will depend in part upon the particular design of the column and the plates.

(2) Increased volatility ratio of key components—The volatility ratio ($a$) is increased by decreased pressure and also by decreased temperature. Since the reboiler temperature is reduced when pressure is reduced, both benefits are realized as an increased volatility ratio. Such an increase in the $a$-value for ethane and propylene permits better de-ethanization of the propylene product for a given propylene recovery, or reduced reflux rate for the same separation efficiency, or other means of taking advantage of the greater ease of fractionation. For example, for a given separation which normally requires a pressure of 585 p. s. i. a., the average of top and bottom volatility ratios for ethane and propane is, $a_{32}=1.76$, whereas, at 400 p. s. i. a. the average $a_{32}=1.99$, and of the 13.5% increase in $a$-value, about 95% of it is to be attributed to decreased pressure and about 5% to decreased reboiler temperature;

(3) Lower critical temperature for hydrate formation—at lower pressures the critical temperature for hydrate formation is lower, so that somewhat lower reflux temperature may be employed without hydrate formation, thus saving even more propylene through reduced demand for dewpoint-maintaining $C_3$ in the top gas;

(4) Greater reflux capacity as is seen from the foregoing discussion.

Having now set forth the nature of the invention in general terms and having also enumerated various advantages resulting from application of the method of the invention, the invention will be more fully understood from the following description thereof made with reference to its application to the separation of two of the components of an exemplary mixture, and made with reference to the accompanying drawing which is a part of this application and which is a diagrammatic sketch showing the separation of propylene from ethane in a mixture thereof and also with propane and $C_4$ hydrocarbons.

Referring to the drawing, 11 represents a fractionating column which may be of bubble cap type or of any other suitable type, composed of rectification section 12 and stripping section 14, and provided with intermediate feed inlet 15, top vapor outlet line 16 with condenser 17, reflux accumulator 19 and reflux return line 20, reboiler means 21, and bottom liquid drawoff means 22. A feed mixture comprising essentially $C_2$, $C_3$ and $C_4$ hydrocarbons, both saturated and olefinic, is fed through line 15, at suitable temperature and elevated pressure, to an intermediate section of column 11 wherein it is fractionated to yield an overhead gaseous or vapor product which is withdrawn through line 16, and a liquid bottoms product which is withdrawn through line 22. The column overhead product is partially condensed in condenser 17, with the condensate being accumulated in reflux accumulator 19 and return therefrom by way of line 20 to the top of column 11 as liquid reflux for the rectification section. The uncondensed portion of the overhead product is removed from accumulator 19 through valved line 24. A suitable heating or reboiler means 21 supplies the requisite amount of heat to effect the desired stripping action in the stripping section of the column. In order to improve the recovery of the propylene in the bottom product withdrawn through line 22, and to improve the operation of the fractionating column, liquid propane, or a mixture which contains a larger ratio of propane to propylene than the ratio of propane to propylene normally present in the top overhead gas in line 16 and also in accumulator 19, is supplied as reflux liquid to the top of column 11 by means of a valved line 25 and line 20. This extraneous propane serves not only to replace a portion of the propylene which would normally be taken overhead through line 16 but results in other economies of operation as already discussed above. Furthermore, advantages are obtained by introducing the extraneous propane as reflux liquid over what would be the resultant of incorporating an equivalent amount of propane from an extraneous source with the feed mixture. By the latter method there would still be set up a normal distribution of the feed components throughout the fractionating column, whereas, by introducing the additional propane as liquid reflux, the propane concentration in the top part of the column is increased abnormally with accompanying advantageous changes in distribution ratios throughout the column.

The operation of the method in accordance with the invention and the advantages resulting from practice of the invention over the normal practice, will be more clearly understood from the following illustrative examples of comparative operations according to normal practice and by the practice of this invention. For the purpose of comparison, a feed mixture containing the following substances in the indicated mol proportions: $H_2S$—195, methane—365, ethylene—191, ethane—1197, propylene—1387, propane—2662, butane—4430 and $C_5$—6028, was fractionated in a fractionating column of 4.5 feet in diameter and having a total of 37 plates, each plate above the feed plate having eight cap-and-downspout assemblies and being spaced 15 inches from the next plate, and each plate below the feed plate having sixteen cap-and-downspout assemblies and being spaced 18 inches from the next plate. The feed was delivered to the column at about 190° F. The overhead was partially condensed to yield reflux and top vapor product. Under normal operating practice the column was operated at 585 p. s. i. a., in order to keep the loss of propylene-propane in the top vapor product to a minimum, while condensing sufficient reflux at the accumulator temperature of 80° F. (Largely because of high $H_2S$ content, the reflux had to be kept above 70-80° F. to prevent the formation of solid hydrates which would plug the condenser and lines.) The high methane content of the top vapor required, even at 585 p. s. i. a., at least 23 mol percent of $C_3$—hydrocarbons to maintain an 80° F. dewpoint. The data in Table I, below, are the results showing material balance in barrels per day representing comparative operations under similar pressure and condenser temperature, the one by normal practice and the other with injection of extraneous propane reflux.

process than by any other consideration. As seen from the data in Table I, an injection of an amount of extraneous agent as low as ten percent of the normal reflux effects a substantial increase in recovery of the desired component; normally, the proportion of extraneously injected material should be at least equivalent in mols to the proportion of material which it is desired to recover from the overhead, and preferably to that amount plus an amount equivalent to other materials therewith which are about equivalent thereto in vapor characteristics, and which is normally present in the top vapor product without any injection.

I claim as my invention:

1. In a fractional distillation process for the separation of propylene from ethane in a mixture consisting essentially of methane, ethane, propylene, propane and $C_4$ hydrocarbons, wherein the mixture is rectified in a rectifying zone to produce an overhead vapor containing methane, ethane, propylene and propane and a bottoms liquid portion comprising essentially propylene, propane and $C_4$ hydrocarbons, said overhead vapor is partially condensed to produce a condensate of a major portion of the propylene and propane therein and said condensate is returned as reflux to the rectifying zone, the improvement which comprises augmenting the condensate-reflux with propane taken from an extraneous source in amount at least equivalent in mols to the amount of propylene and propane in the uncondensed overhead vapor portion prior to said augmentation, to increase the recovery of the propylene in the bottoms liquid product.

2. In a fractional distillation process for the separation of propylene from ethane in a mixture of lower molecular weight hydrocarbons comprising essentially ethane and hydrocarbons more volatile than ethane and propylene and hydrocarbons less volatile than propylene where-

TABLE I

Material balance in barrels per day

|  | Normal Practice | | | | With Propane Injection | | | |
| --- | --- | --- | --- | --- | --- | --- | --- | --- |
|  | Feed | Reflux | Top | Btms. | Feed | Reflux | Top | Btms. |
| $C_1$ | 440 | 750 | 400 | 40 | 440 | 1,000 | 400 | 40 |
| Propylene | 333 | 340 | 48 | 285 | 333 | 90 | 10 | 323 |
| Propane | 667 | 410 | 52 | 615 | 667 | 910 | 90 | 727 |
| $C_4+$ | 3,000 | | | 3,000 | 3,000 | | | 3,000 |
| Total | 4,440 | 1,500 | 500 | 3,940 | 4,440 | 2,000 | 500 | 4,090 |
| Injected Propane | | | | | 150 | | | |

Thus, it is seen that the injection of extraneous propane into the reflux stream resulted in an improved recovery and separation of the propylene from the ethylene.

The above example has shown the utility of the present invention in the separation of two difficultly separable lower molecular weight hydrocarbons from a mixture thereof by a fractional distillation process wherein a third hydrocarbon with distillation characteristics very similar to the less volatile one of said two hydrocarbons is injected into the reflux stream of the distillation.

The proportion of injected extraneous substance, it will be readily understood from the foregoing description of the invention and the factors involved, may be varied over a rather wide range, the upper limit of which, of course, will be determined more by economies of the in said mixture is fractionally distilled in a fractionating zone to produce an overhead vapor containing a major portion of the ethane in said mixture together with a portion of said propylene and a bottoms liquid portion containing a major portion of the propylene in said mixture, said overhead vapor is partially condensed to produce a condensate containing a substantial portion of the propylene therein and the condensate is returned as reflux to an upper section of said fractionating zone, the improvement which comprises incorporating with the condensate-reflux an amount of propane taken from an extraneous source at least equivalent in mols to the amount of propylene in the uncondensed portion of the overhead vapor portion prior to said incorporation, to increase the recovery of the propylene in the bottoms liquid product.

3. In a fractional distillation process for the separation of propylene from ethane in a mixture consisting essentially of ethane, propylene and propane, wherein the mixture is rectified in a rectifying zone to produce an overhead vapor containing ethane, propylene and propane and a bottoms liquid portion, said overhead vapor is partially condensed to produce a condensate of a major portion of the propylene and propane therein and the condensate is returned as reflux to the rectifying zone, the improvement which comprises augmenting the condensate-reflux with propane taken from an extraneous source in amount at least equivalent in mols to the amount of propylene and propane in the uncondensed overhead vapor portion prior to said augmentation, to increase the recovery of the propylene in the bottoms liquid product.

4. In a fractional distillation process for the separation of propylene from ethane in a mixture thereof wherein the mixture is subjected to rectification in a rectifying zone to produce an overhead vapor and a bottoms liquid portion and said overhead vapor is partially condensed and the resulting condensate is returned as a reflux stream to the rectifying zone, the improvement which comprises augmenting the reflux stream with propane taken from an extraneous source in an amount at least equivalent in mols to the amount of propylene in the uncondensed overhead vapor portion prior to said augmentation to increase the recovery of the propylene in the bottoms liquid product.

5. In a fractional distillation process for the separation of propylene from ethane in a mixture consisting essentially of saturated and olefinic hydrocarbons having from one to four carbon atoms per molecule and of hydrogen sulfide, wherein the mixture is fractionated in a fractionating zone to produce an overhead vapor containing a major portion of the ethane in said mixture and the substances less volatile than ethane and an appreciable amount of propylene and a bottoms liquid portion containing a major portion of the propylene in said mixture, said overhead vapor is partially condensed to produce a condensate which contains a substantial proportion of the propylene in said overhead vapor and said condensate is returned as reflux to an upper portion of said fractionating zone, the improvement which comprises augmenting the condensate reflux with propane taken from an extraneous source and in amount at least equivalent in mols to the amount of propylene in the uncondensed overhead vapor portion prior to said augmentation, to increase the recovery of the propylene in the bottoms liquid product.

6. In a fractional distillation process for the recovery of a lower molecular weight olefinic hydrocarbon B from the next lower saturated hydrocarbon A in a mixture consisting essentially of saturated and olefinic hydrocarbons having from one to four carbon atoms per molecule wherein the mixture is fractionated in a fractionating zone to substantially separate said hydrocarbons into an overhead vapor containing a major portion of said next lower saturated hydrocarbon A in said mixture and an appreciable but minor proportion of said lower molecular weight olefinic hydrocarbon B and a bottoms liquid portion containing a major portion of olefinic hydrocarbon B in said mixture, and said overhead vapor is at least partially condensed to produce a condensate which is returned as condensate-reflux to an upper section of said fractionating zone, the improvement which comprises incorporating with said condensate-reflux a substantial proportion, at least equivalent in mols to the amount of olefinic hydrocarbon B in the uncondensed overhead vapor portion prior to said augmentation, of a saturated hydrocarbon having the same number of carbon atoms as said olefinic hydrocarbon B, to increase the recovery of said olefinic hydrocarbon B in said bottoms product.

7. In a fractional distillation process for the separation of a volatile lower molecular weight hydrocarbon B from a relatively slightly more volatile hydrocarbon A in a mixture consisting essentially of saturated and olefinic hydrocarbons having from one to four carbon atoms per molecule wherein the mixture is rectified in a rectifying zone to produce an overhead vapor comprising essentially a major portion of said more volatile hydrocarbon A and a minor proportion of said volatile hydrocarbon B and a bottoms product containing a major portion of said volatile hydrocarbon B, and said overhead vapor is at least partially condensed to produce a condensate which is returned as a reflux stream to the rectifying zone, the improvement which comprises augmenting the reflux stream with a relatively slightly less volatile hydrocarbon C than said volatile lower molecular weight hydrocarbon and taken from an extraneous source said hydrocarbon C being identical with a hydrocarbon component of said mixture and being used in amount at least equivalent in mols to the amount of hydrocarbon B in the uncondensed overhead vapor portion prior to said augmentation, to increase the recovery of said lower molecular weight hydrocarbon in said bottoms product.

JOOST HUDIG.

REFERENCES CITED

The following references are of record in the file of this patent:

UNITED STATES PATENTS

| Number | Name | Date |
|---|---|---|
| 2,227,953 | Baehr et al. | Jan. 7, 1941 |
| 2,321,666 | Felbeck | June 15, 1943 |
| 2,404,923 | Patterson | July 30, 1946 |